United States Patent
Abiko et al.

(10) Patent No.: US 10,920,018 B2
(45) Date of Patent: Feb. 16, 2021

(54) POLYIMIDE RESIN AND POLYIMIDE RESIN COMPOSITION

(71) Applicant: MITSUBISHI GAS CHEMICAL COMPANY, INC., Tokyo (JP)

(72) Inventors: Yohei Abiko, Kanagawa (JP); Saeko Sato, Kanagawa (JP); Aoi Daito, Kanagawa (JP); Shinji Sekiguchi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 55 days.

(21) Appl. No.: 16/098,644

(22) PCT Filed: Apr. 21, 2017

(86) PCT No.: PCT/JP2017/016076
§ 371 (c)(1),
(2) Date: Nov. 2, 2018

(87) PCT Pub. No.: WO2017/195574
PCT Pub. Date: Nov. 16, 2017

(65) Prior Publication Data
US 2020/0055987 A1    Feb. 20, 2020

(30) Foreign Application Priority Data

May 9, 2016    (JP) .............................. JP2016-094118

(51) Int. Cl.
*C08G 73/10*    (2006.01)
*C08J 5/18*    (2006.01)

(52) U.S. Cl.
CPC ..... *C08G 73/1082* (2013.01); *C08G 73/1007* (2013.01); *C08G 73/1042* (2013.01); *C08G 73/1064* (2013.01); *C08G 73/1078* (2013.01); *C08J 5/18* (2013.01); *C08J 2333/24* (2013.01)

(58) Field of Classification Search
CPC ............ C08G 73/1007; C08G 73/1042; C08G 73/1078
See application file for complete search history.

(56) References Cited

U.S. PATENT DOCUMENTS

| | | | |
|---|---|---|---|
| 2008/0176984 A1 | 7/2008 | Hwang et al. | |
| 2016/0002407 A1* | 1/2016 | Wakita | C08G 73/106 257/40 |
| 2018/0086939 A1* | 3/2018 | Kato | C09D 179/08 |

FOREIGN PATENT DOCUMENTS

| | | |
|---|---|---|
| EP | 1022301 A1 | 7/2000 |
| EP | 2865702 A1 | 4/2015 |
| JP | 1-138787 | 5/1989 |
| JP | 2001-348477 | 12/2001 |
| JP | 2003-155342 | 5/2003 |
| JP | 2003155342 A * | 5/2003 |
| WO | 2015/122032 A1 | 8/2015 |

OTHER PUBLICATIONS

Official Communication issued in International Bureau of WIPO Patent Application No. PCT/JP2017/016076, dated Jun. 13, 2017, along with an English translation thereof.

* cited by examiner

*Primary Examiner* — Richard A Huhn
(74) *Attorney, Agent, or Firm* — Greenblum & Bernstein, P.L.C.

(57) ABSTRACT

A polyimide resin including a structural unit A derived from a tetracarboxylic dianhydride and a structural unit B derived from a diamine compound, wherein the structural unit A includes a structural unit (A-1) derived from a compound represented by the following formula (a-1), and the structural unit B includes a structural unit (B-1) derived from a compound represented by the following formula (b-1):

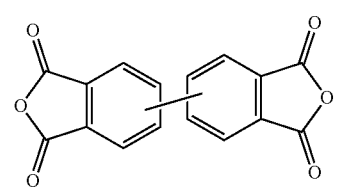

(a-1)

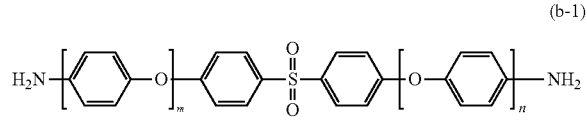

(b-1)

wherein m and n in the formula (b-1) each independently are an integer of 0 or 1.

6 Claims, No Drawings

POLYIMIDE RESIN AND POLYIMIDE RESIN COMPOSITION

TECHNICAL FIELD

The present invention relates to a polyimide resin and a polyimide resin composition.

BACKGROUND ART

A polyimide resin has excellent mechanical properties, heat resistance, and chemical resistance, and has been widely used in the electric and electronic fields and the like, particularly as a material for an optical member. The material used for an optical member needs to have excellent optical properties (such as high refractive index) and transparency in addition to excellent heat resistance, mechanical properties and the like.

For example, PTL 1 has proposed a high refractive-index material composition containing a polyimide resin having a predetermined structure and inorganic microparticles. PTL 1 has reported that there can be provided a high refractive-index material composition having a refractive index as high as 1.70 or more, excellent heat resistance, and a glass transition temperature of 200° C. or higher.

CITATION LIST

Patent Literature

PTL 1: JP-A-2001-348477

SUMMARY OF INVENTION

Technical Problem

However, the high refractive-index material composition described in PTL 1 is poor in transparency which is required for the material to be used for an optical member.

Accordingly, an object of the present invention is to provide a polyimide resin capable of forming a polyimide film having a high refractive index and excellent transparency.

Solution to Problem

The present inventors have found that a polyimide resin including specific structural units can achieve the above-mentioned object, thereby completing the present invention.

Specifically, the present invention is a polyimide resin including a structural unit A derived from a tetracarboxylic dianhydride and a structural unit B derived from a diamine compound, wherein the structural unit A includes a structural unit (A-1) derived from a compound represented by the following formula (a-1), and the structural unit B includes a structural unit (B-1) derived from a compound represented by the following formula (b-1):

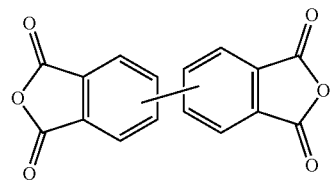

(a-1)

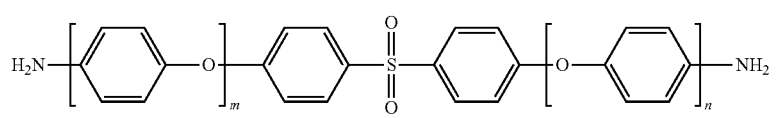

(b-1)

wherein m and n in the formula (b-1) each independently are an integer of 0 or 1.

Advantageous Effects of Invention

According to the present invention, there can be provided a polyimide resin capable of forming a polyimide film having a high refractive index and excellent transparency.

DESCRIPTION OF EMBODIMENTS

The polyimide resin of the present invention includes a structural unit A derived from a tetracarboxylic dianhydride and a structural unit B derived from a diamine compound.

The structural unit A includes a structural unit (A-1) derived from a compound represented by the following formula (a-1) (biphenyltetracarboxylic dianhydride (BPDA)). The proportion of the structural unit (A-1) in the structural unit A derived from a tetracarboxylic dianhydride is preferably 40 mol % or more, more preferably 50 mol % or more, further preferably 60 mol % or more.

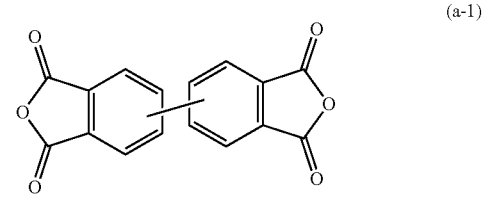

(a-1)

Examples of compounds represented by the formula (a-1) include 3,3',4,4'-BPDA (s-BPDA) represented by the following formula (a-1-1), 2,3,3',4'-BPDA (a-BPDA) represented by the following formula (a-1-2), and 2,2',3,3'-BPDA (i-BPDA) represented by the following formula (a-1-3).

s-BPDA is preferred in view of the refractive index and organic solvent resistance, a-BPDA is preferred in view of the heat resistance and solution processability, and i-BPDA is preferred in view of the heat resistance and solution processability.

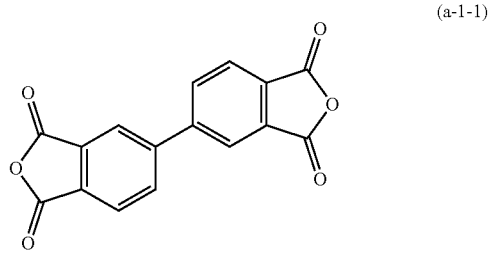

(a-1-1)

-continued

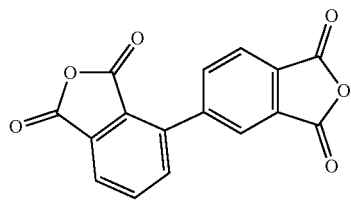
(a-1-2)

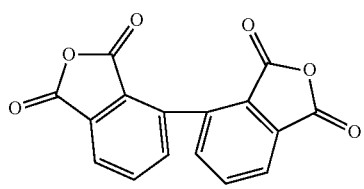
(a-1-3)

The structural unit A preferably further includes a structural unit (A-2) derived from a compound represented by the following formula (a-2). The further inclusion of the structural unit (A-2) can improve the transparency, solution processability, and heat resistance.

The proportion of the structural unit (A-2) in the structural unit A derived from a tetracarboxylic dianhydride is preferably 60 mol % or less, more preferably 50 mol % or less, further preferably 40 mol % or less.

The total content of the structural units (A-1) and (A-2) in the structural unit A is preferably 40 mol % or more, more preferably 70 mol % or more, further preferably 85 mol % or more, especially preferably 99 mol % or more, most preferably 100 mol %.

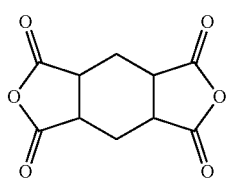
(a-2)

The structural unit B derived from a diamine compound includes a structural unit (B-1) derived from a compound represented by the following formula (b-1). The inclusion of the structural unit (B-1) can improve the refractive index and solution processability while maintaining the transparency.

The proportion of the structural unit (B-1) in the structural unit B is preferably 50 mol % or more, more preferably 70 mol % or more, further preferably 85 mol % or more, especially preferably 99 mol % or more, most preferably 100 mol %.

a structural unit (B-1-2) derived from a compound represented by the following formula (b-1-2).

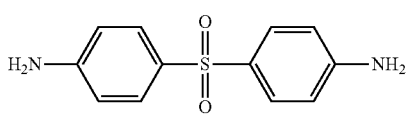
(b-1-1)

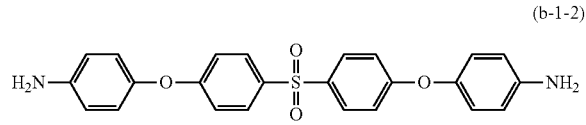
(b-1-2)

The structural unit B preferably includes the structural unit (B-1-1) as the structural unit (B-1) from the viewpoint of achieving low coloration, namely, from the viewpoint of obtaining a polyimide film having a small yellow index (YI). In this case, the proportion of the structural unit (B-1-1) in the structural unit (B-1) is preferably 50 mol % or more, more preferably 75 mol % or more, further preferably 100 mol %.

Further, the structural unit B preferably includes both the structural unit (B-1-1) and the structural unit (B-1-2) as the structural unit (B-1). In this case, the proportion of the total of the structural units (B-1-1) and (B-1-2) in the structural unit (B-1) is preferably 50 mol % or more, more preferably 75 mol % or more, further preferably 100 mol %. Further, the molar ratio of structural unit (B-1-1)/structural unit (B-1-2) is preferably 50/50 to 90/10, more preferably 70/30 to 90/10, further preferably 75/25 to 85/15.

The structural unit B may further include a structural unit (B-2) derived from a compound represented by the following formula (b-2).

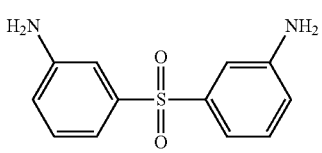
(b-2)

The proportion of the structural unit (B-2) in the structural unit B is preferably 50 mol % or less, more preferably 40 mol % or less. By virtue of including the structural unit (B-2), the solution processability can be improved while maintaining the transparency.

The total content of the structural units (B-1) and (B-2) in the structural unit B is preferably 50 mol % or more, more

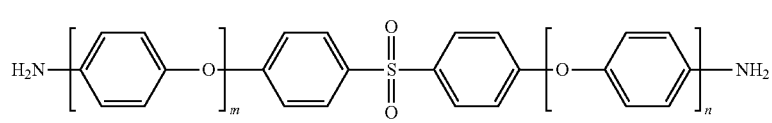
(b-1)

In the formula (b-1), m and n each independently are an integer of 0 or 1.

The structural unit B preferably includes, as the structural unit (B-1), a structural unit (B-1-1) derived from a compound represented by the following formula (b-1-1) and/or preferably 70 mol % or more, further preferably 85 mol % or more, especially preferably 99 mol % or more, most preferably 100 mol %.

The polyimide resin of the present invention preferably has a number average molecular weight of 5,000 to 100,000 from the viewpoint of the mechanical strength of the polyimide film obtained therefrom. The number average molecular weight of the polyimide resin can be measured by gel permeation chromatography or the like.

A polyimide film having a thickness of 40 μm obtained from the polyimide resin of the present invention preferably has a total light transmittance of 85% or more, more preferably 87% or more.

Further, a polyimide film having a thickness of 40 μM obtained from the polyimide resin preferably has a yellow index (YI) of 10.0 or less, more preferably 7.0 or less, further preferably 5.0 or less. When the polyimide film obtained from the polyimide resin has a total light transmittance in the above-mentioned range and a YI in the above-mentioned range, the polyimide film can exhibit high colorlessness and transparency.

Further, a polyimide film obtained from the resin preferably has a refractive index of 1.65 or more, more preferably 1.70 or more.

The polyimide resin of the present invention can be produced by reacting the above-mentioned specific tetracarboxylic dianhydride component with the above-mentioned specific diamine component.

The tetracarboxylic dianhydride component essentially includes the above-mentioned compound represented by the formula (a-1), and, if necessary, includes the compound represented by the formula (a-2). The diamine component essentially includes the compound represented by the formula (b-1), and, if necessary, includes the compound represented by the formula (b-2).

These compounds may be derivatives thereof as long as they can form their respective corresponding structural units.

In producing the polyimide resin of the present invention, the ratio of the amounts of the charged tetracarboxylic dianhydride component and diamine component is preferably such that the amount of the diamine component is 0.9 to 1.1 mol relative to 1 mol of the tetracarboxylic dianhydride component.

In producing the polyimide resin of the present invention, an end-capping agent may be used in addition to the tetracarboxylic dianhydride component and diamine component. The end-capping agent is preferably monoamines or dicarboxylic acids. The amount of the charged end-capping agent to be introduced is preferably 0.0001 to 0.1 mol, especially preferably 0.001 to 0.06 mol, relative to 1 mol of the tetracarboxylic dianhydride component. With respect to the monoamine end-capping agent, for example, methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, 4-methylaniline, and the like are recommended. Of these, benzylamine and aniline can be preferably used. With respect to the dicarboxylic acid end-capping agent, preferred are dicarboxylic acids, part of which may be cyclized. For example, phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid, 4-cyclohexene-1,2-dicarboxylic acid, and the like are recommended. Of these, phthalic acid and phthalic anhydride can be preferably used.

The method for reacting the above-mentioned tetracarboxylic dianhydride component and diamine component is not particularly limited, and known methods can be used.

As specific examples of reaction methods, there can be mentioned (1) a method in which a tetracarboxylic dianhydride component, a diamine component, and a reaction solvent are charged into a reactor and the resultant mixture is stirred at room temperature to 80° C. for 0.5 to 30 hours, followed by temperature elevation, to perform an imidation reaction, (2) a method in which a diamine component and a reaction solvent are charged into a reactor to dissolve the diamine, and then a tetracarboxylic dianhydride component is charged and the resultant mixture is stirred appropriately at room temperature to 80° C. for 0.5 to 30 hours, followed by temperature elevation, to perform an imidation reaction, and (3) a method in which a tetracarboxylic dianhydride component, a diamine component, and a reaction solvent are charged into a reactor and then, immediately the temperature is elevated to perform an imidation reaction.

With respect to the reaction solvent used in the production of the polyimide resin, any solvent can be used as long as it does not inhibit an imidation reaction and can dissolve therein the formed polyimide resin. Examples of reaction solvents include aprotic solvents, phenolic solvents, ether solvents, and carbonate solvents.

Specific examples of aprotic solvents include amide solvents, such as N,N-dimethylisobutylamide (DMIB), N,N-dimethylformamide, N,N-dimethylacetamide, N-methyl-2-pyrrolidone, N-methylcaprolactam, 1,3-dimethylimidazolidinone, and tetramethylurea; lactone solvents, such as γ-butyrolactone and γ-valerolactone; phosphorus-containing amide solvents, such as hexamethylphosphoric amide and hexamethylphosphine triamide; sulfur-containing solvents, such as dimethyl sulfone, dimethyl sulfoxide, and sulfolane; ketone solvents, such as acetone, cyclohexane, and methylcyclohexane; amine solvents, such as picoline and pyridine; and ester solvents, such as (2-methoxy-1-methylethyl) acetate.

Specific examples of phenolic solvents include phenol, o-cresol, m-cresol, p-cresol, 2,3-xylenol, 2,4-xylenol, 2,5-xylenol, 2,6-xylenol, 3,4-xylenol, and 3,5-xylenol.

Specific examples of ether solvents include 1,2-dimethoxyethane, bis(2-methoxyethyl) ether, 1,2-bis(2-methoxyethoxy)ethane, bis[2-(2-methoxyethoxy)ethyl]ether, tetrahydrofuran, and 1,4-dioxane.

Further, specific examples of carbonate solvents include diethyl carbonate, methylethyl carbonate, ethylene carbonate, and propylene carbonate.

Of the above reaction solvents, amide solvents or lactone solvents are preferred. The reaction solvents may be used singly or in combination of two or more thereof.

In the imidation reaction, it is preferred that the reaction is conducted while removing water formed during the production of polyimide using a Dean-Stark apparatus or the like. By performing such an operation, it is possible to further increase the degree of polymerization and imidation ratio.

In the above-mentioned imidation reaction, a known imidation catalyst can be used. Examples of imidation catalysts include basic catalysts and acid catalysts.

Examples of basic catalysts include organic basic catalysts, such as pyridine, quinoline, isoquinoline, α-picoline, β-picoline, 2,4-lutidine, 2,6-lutidine, trimethylamine, triethylamine, tripropylamine, tributylamine, imidazole, N,N-dimethylaniline, and N,N-diethylaniline, and inorganic basic catalysts, such as potassium hydroxide, sodium hydroxide, potassium carbonate, sodium carbonate, potassium hydrogencarbonate, and sodium hydrogencarbonate.

Further, examples of acid catalysts include crotonic acid, acrylic acid, trans-3-hexenoic acid, cinnamic acid, benzoic acid, methylbenzoic acid, oxybenzoic acid, terephthalic acid, benzenesulfonic acid, paratoluenesulfonic acid, and naphthalenesulfonic acid. The above-mentioned imidation catalysts may be used singly or in combination of two or more thereof.

Of the above catalysts, from the viewpoint of the handling properties, a basic catalyst is preferably used, an organic basic catalyst is more preferably used, and triethylamine is further preferably used.

When using the catalyst, from the viewpoint of the reaction rate and suppression of gelation or the like, the temperature for the imidation reaction is preferably 120 to 250° C., more preferably 160 to 200° C. Further, the reaction time is preferably 0.5 to 10 hours after the start of distilling of the water formed.

When using no catalyst, the temperature for the imidation reaction is preferably 200 to 350° C.

The polyimide resin composition of the present invention contains the above-described polyimide resin of the present invention, and inorganic particles having a refractive index of 2.0 or more and an average particle diameter D50 of 20 nm or less.

The refractive index of the inorganic particles can be determined, for example, by making measurement as follows. Specifically, a coating composition containing inorganic particles incorporated into an acrylic resin is applied to a PET film, and a refractive index of the formed coating film is measured. In this instance, a plurality of coating films having different amounts of the incorporated inorganic particles are formed, and refractive index values of the coating films are measured and plotted to extrapolate a refractive index from them, calculating a refractive index of the inorganic particles. As a measuring apparatus, for example, reflectance spectroscopy Thickness Monitor "FE-3000", manufactured by Otsuka Electronics Co., Ltd., can be used.

Further, the average particle diameter D50 of the inorganic particles is determined, for example, by dispersing the inorganic particles in a dispersion medium to measure and calculate an average particle diameter. As a measuring apparatus, for example, DLS particle size distribution meter "Nanotrac UPA-UT151", manufactured by MicrotracBEL Corp., can be used.

With respect to the refractive index and average particle diameter D50 of the inorganic particles, their respective catalog values can also be employed.

The inorganic particles are preferably at least any of zirconium oxide particles, titanium oxide particles, zinc oxide particles, zinc sulfide particles, chromium oxide particles, barium titanate particles, and silicon particles, and are preferably zirconium oxide particles and/or titanium oxide particles.

The inorganic particles are preferably contained in the polyimide resin composition in an amount of 10 to 60% by mass, more preferably 20 to 50% by mass, in terms of a solid content.

The polyimide resin composition of the present invention may be mixed with various additives to form a polyimide resin composition as long as the effects of the present invention are not impaired. Examples of additives include an antioxidant, a light stabilizer, a surfactant, a flame retardant, a plasticizer, and polymer compounds other than the above-mentioned polyimide resin.

The solid content concentration of the resin composition can be appropriately selected according to the operation properties upon forming the polyimide film or the like, and the solid content concentration or viscosity of the composition may be controlled by adding an organic solvent to the composition. With respect to the organic solvent, there is no particular limitation as long as it can dissolve therein the polyimide resin.

The polyimide film of the present invention contains a cured product of the above-described polyimide resin or the above-described polyimide resin composition. Specifically, the polyimide film obtained by subjecting the above-described polyimide resin or polyimide resin composition to imidation (curing) has high refractive index, and has excellent colorlessness and transparency depending on the structural unit.

The method for forming the polyimide film is not particularly limited, and known methods can be used. For example, there can be mentioned a method in which the polyimide resin solution in the present invention containing an organic solvent, or the polyimide resin composition containing the polyimide resin and the above-mentioned various additives is applied or shaped into a film form, and then the organic solvent is removed.

The thickness of the above-obtained polyimide film is preferably 1 to 250 µm, and can be appropriately selected according to the use of the film or the like. When the polyimide film has a thickness of 1 to 250 µm, the polyimide film can be practically used as a self-supporting film. The thickness of the polyimide film is more preferably 1 to 50 µm.

The polyimide resin (composition) of the present invention is advantageously used in an optical lens for CCD, a CMOS senser and the like, a sealing material and a light extraction layer for an LED, an organic EL and the like, an antireflection film, a multilayer optical film, a microlens array, a color filter, a flexible display, and the like.

EXAMPLES

Hereinbelow, the present invention will be described in detail with reference to the following Examples, which should not be construed as limiting the scope of the present invention.

Example 1

Into a 300 mL glass five-neck round bottom flask, 22.017 g (0.089 mol) of bis(4-aminophenyl) sulfone (manufactured by Wakayama Seika Kogyo Co., Ltd.) as a diamine component, 54.90 g of γ-butyrolactone (manufactured by Mitsubishi Chemical Corporation) as an organic solvent, and 0.449 g of triethylamine (manufactured by Kanto Chemical Co., Inc.) as an imidation catalyst were charged, and the resultant mixture was stirred at the number of revolutions of 200 rpm in a nitrogen gas atmosphere at a temperature of 70° C. inside the system to obtain a solution. 7.951 g (0.035 mol) of 1,2,4,5-cyclohexanetetracarboxylic dianhydride (manufactured by Mitsubishi Gas Chemical Company, Inc.) as an alicyclic tetracarboxylic dianhydride component, 15.652 g (0.053 mol) of 3,3',4,4'-biphenyltetracarboxylic dianhydride (manufactured by Mitsubishi Chemical Corporation) as an aromatic tetracarboxylic dianhydride component, and 13.73 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 5 hours to obtain a polyimide solution. Then, the temperature inside the reaction system was lowered to 120° C. and then 101.59 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (A) having a solid content concentration of 20% by mass.

Subsequently, the polyimide resin solution (A) was applied onto a glass substrate, and maintained at 60° C. for 30 minutes and at 100° C. for one hour to cause the solvent to volatilize, obtaining a colorless, transparent primary-dried film having self-supporting properties. Further, the resultant film was fixed to a stainless steel frame and dried in a nitrogen gas atmosphere at 280° C. for 2 hours to remove the solvent, obtaining a polyimide film having a thickness of 40 µm. An FT-IR analysis made with respect to the obtained polyimide film has confirmed disappearance of the raw material peaks and appearance of a peak deriving from an imide skeleton.

This polyimide film had a total light transmittance of 86.3%, a transmittance of 37.9% at a wavelength of 400 nm, a transmittance of 76.8% at a wavelength of 420 nm, a transmittance of 84.0% at a wavelength of 450 nm, a YI value of 4.9, a Tg of 379° C., and a refractive index nD of 1.67.

Example 2

Into the same 300 mL glass five-neck round bottom flask as used in Example 1, 7.025 g (0.016 mol) of bis[4-(4-aminophenoxy)phenyl] sulfone (manufactured by Wakayama Seika Kogyo Co., Ltd.) and 16.133 g (0.065 mol) of bis(4-aminophenyl) sulfone (manufactured by Wakayama Seika Kogyo Co., Ltd.) as a diamine component, 53.86 g of γ-butyrolactone (manufactured by Mitsubishi Chemical Corporation) as an organic solvent, and 0.411 g of triethylamine (manufactured by Kanto Chemical Co., Inc.) as an imidation catalyst were charged, and the resultant mixture was stirred at the number of revolutions of 200 rpm in a nitrogen gas atmosphere at a temperature of 70° C. inside the system to obtain a solution. 7.282 g (0.032 mol) of 1,2,4,5-cyclohexanetetracarboxylic dianhydride (manufactured by Mitsubishi Gas Chemical Company, Inc.) as an alicyclic tetracarboxylic dianhydride component, 14.336 g (0.049 mol) of 3,3',4,4'-biphenyltetracarboxylic dianhydride (manufactured by Mitsubishi Chemical Corporation) as an aromatic tetracarboxylic dianhydride component, and 13.47 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 5 hours to obtain a polyimide solution. Then, the temperature inside the reaction system was lowered to 120° C. and then 100.51 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (B) having a solid content concentration of 20% by mass.

Subsequently, the obtained polyimide resin solution (B) was applied onto a glass substrate, and maintained on a hotplate at 100° C. for 60 minutes to cause the solvent to volatilize, obtaining a colorless, transparent primary-dried film having self-supporting properties. Further, the resultant film was fixed to a stainless steel frame and heated in a hot-air dryer at 250° C. for 2 hours to cause the solvent to volatilize, obtaining a polyimide film having a thickness of 40 µm. An FT-IR analysis made with respect to the obtained polyimide film has confirmed disappearance of the raw material peaks and appearance of a peak deriving from an imide skeleton.

This polyimide film had a total light transmittance of 87.7%, a transmittance of 82.7% at a wavelength of 400 nm, a transmittance of 53.1% at a wavelength of 420 nm, a transmittance of 84.4% at a wavelength of 450 nm, a YI value of 6.4, a Tg of 282° C., and a refractive index nD of 1.67.

Example 3

Into a 300 mL four-neck round bottom flask equipped with a stainless steel agitating blade in a half-moon shape, a nitrogen gas introducing pipe, a thermometer, and a glass end cap, 30.00 g of a zirconia particles dispersion (SZR-DMAc, manufactured by Sakai Chemical Industry Co., Ltd. (solid content concentration: 31% by mass)) and 32.00 g of DMAc (manufactured by Mitsubishi Gas Chemical Company, Inc.) were charged, and the resultant mixture was stirred at the number of revolutions of 200 rpm in a nitrogen gas atmosphere at room temperature to obtain a diluted zirconia particles dispersion (solid content concentration: 15% by mass). Then, 60.00 g of the obtained diluted dispersion and 45 g of the polyimide resin solution (A) (solid content concentration: 20% by mass) were kneaded using T. K. HOMODISPER Model 2.5 (manufactured by PRIMIX Corporation) at the number of revolutions of 2,000 rpm for 5 minutes to obtain a kneaded mixture.

The dispersion medium for the zirconia particles dispersion used is DMAc, the D50 is 10 nm or less, and the refractive index of the zirconia particles is 2.11.

Subsequently, the kneaded mixture was applied onto a glass substrate, and maintained at 60° C. for 30 minutes and at 100° C. for one hour to cause the solvent to volatilize, obtaining a colorless, transparent primary-dried film having self-supporting properties. Further, the resultant film was fixed to a stainless steel frame and dried in a nitrogen gas atmosphere at 280° C. for 2 hours to remove the solvent, obtaining a polyimide film having a thickness of 40 µm. An FT-IR analysis made with respect to the obtained polyimide film has confirmed disappearance of the raw material peaks and appearance of a peak deriving from an imide skeleton.

This polyimide film had a total light transmittance of 87.5%, a transmittance of 44.3% at a wavelength of 400 nm, a transmittance of 78.0% at 420 nm, a transmittance of 53.1% at a wavelength of 420 nm, a transmittance of 82.7% at a wavelength of 450 nm, a YI value of 4.8, a Tg of 363° C., and a refractive index nD of 1.71.

Comparative Example 1

Into a 500 mL glass five-neck round bottom flask, 24.83 g (0.10 mol) of bis(3-aminophenyl) sulfone (manufactured by Wakayama Seika Kogyo Co., Ltd.) as a diamine component, 29.11 g (0.099 mol) of 3,3',4,4'-biphenyltetracarboxylic dianhydride (manufactured by Mitsubishi Chemical Corporation) as an aromatic tetracarboxylic dianhydride component, 0.296 g (0.002 mol) of phthalic anhydride as an end-capping agent, and 280 g of N,N-dimethylacetamide (manufactured by Mitsubishi Gas Chemical Company, Inc.) as an organic solvent were charged, and the resultant mixture was stirred at the number of revolutions of 200 rpm in a nitrogen gas atmosphere at room temperature for about 12 hours to obtain a polyamic acid solution.

Subsequently, the polyamic acid solution was applied onto a glass substrate, and maintained at 60° C. for 30 minutes and at 100° C. for one hour, and further dried in a nitrogen gas atmosphere at 300° C. for 2 hours to remove the solvent, thereby performing imidation and obtaining a polyimide film having a thickness of 40 μm. An FT-IR analysis made with respect to the obtained polyimide film has confirmed disappearance of the raw material peaks and appearance of a peak deriving from an imide skeleton.

This polyimide film had a total light transmittance of 83.7%, a transmittance of 22.0% at a wavelength of 400 nm, a transmittance of 64.0% at 420 nm, a transmittance of 74.3% at a wavelength of 450 nm, a YI value of 13.2, a Tg of 285° C., and a refractive index nD of 1.70.

Example 4

Into a 500 mL glass five-neck round bottom flask, 22.192 g (0.051 mol) of bis[4-(4-aminophenoxy)phenyl] sulfone (manufactured by Wakayama Seika Kogyo Co., Ltd.) as a diamine component, 15.004 g (0.049 mol) of 3,3',4,4'-biphenyltetracarboxylic dianhydride (manufactured by Mitsubishi Chemical Corporation) as an aromatic tetracarboxylic dianhydride component, 0.296 g (0.002 mol) of phthalic anhydride as an end-capping agent, and 137.798 g of N,N-dimethylacetamide (manufactured by Mitsubishi Gas Chemical Company, Inc.) as an organic solvent were charged, and the resultant mixture was stirred at the number of revolutions of 200 rpm in a nitrogen gas atmosphere at room temperature for about 12 hours to obtain a polyamic acid solution.

Subsequently, the polyamic acid solution was applied onto a glass substrate, and maintained at 60° C. for 30 minutes and at 100° C. for one hour, and further dried in a nitrogen gas atmosphere at 300° C. for 2 hours to remove the solvent, thereby performing imidation and obtaining a polyimide film having a thickness of 30 μm. An FT-IR analysis made with respect to the obtained polyimide film has confirmed disappearance of the raw material peaks and appearance of a peak deriving from an imide skeleton.

This polyimide film had a total light transmittance of 88.37%, a transmittance of 1.9% at a wavelength of 400 nm, a transmittance of 27.7% at 420 nm, a transmittance of 75.2% at a wavelength of 450 nm, a YI value of 19.9, a Tg of 278° C., and a refractive index nD of 1.67.

In the present Examples, a solid content concentration and a thickness of a film were determined as follows.

(1) Solid Content Concentration

The measurement of a solid content concentration of an alicyclic polyimide resin and a titanium dioxide dispersion was conducted by heating a sample in a small-size electric furnace "MMF-1", manufactured by AS ONE Corporation, at 300° C. for 30 minutes and calculating a solid content concentration from a difference between the weights of the sample before and after the heating.

(2) Thickness of a Film

The measurement of a thickness of a film was conducted using a micrometer, manufactured by Mitutoyo Corporation.

With respect to the obtained polyimide films, the above-mentioned evaluation was conducted by the methods described below. The results are shown in Table 1 below.

(1) Total Light Transmittance and YI (Yellow Index)

In accordance with MS K7105, the measurement was conducted using a color/turbidity simultaneously measuring instrument "COH 400", manufactured by Nippon Denshoku Industries Co., Ltd.

(2) Glass Transition Temperature

Using a differential scanning calorimeter "DSC 6200", manufactured by SII Nano Technology Inc., the DSC measurement was conducted under conditions at a temperature increase rate of 10° C./minute, determining a glass transition temperature.

(3) Refractive Index

A refractive index and an Abbe number of a film were measured using an Abbe refractometer "DR-M4/1550", manufactured by Atago Co., Ltd., with a D ray (589 nm) at a temperature of 23° C. A refractive index measured with a D ray is indicated by nD.

(4) Transmittance at 400 nm, 420 nm, and 450 nm

Using an ultraviolet-visible-near infrared spectrophotometer "UV-3100PC", manufactured by Shimadzu Corporation, the measurement was conducted.

TABLE 1

| | | Example 1 | Example 2 | Example 3 | Comparative Example 1 | Example 4 |
|---|---|---|---|---|---|---|
| Polyimide resin formulation | Compound giving structural unit A (Figures in brackets at lower portion indicate molar ratio) | (a-2)/(a-1-1) [=40/60] | (a-2)/(a-1-1) [=40/60] | (a-2)/(a-1-1) [=40/60] | (a-1-1) | (a-1-1) |
| | Compound giving structural unit B (Figures in brackets at lower portion indicate molar ratio) | (b-1-1) | (b-1-1)/(b-1-2) [=80/20] | (b-1-1) | (b-2) | (b-1-2) |
| | Inorganic particles contained or not | Not contained | Not contained | Contained | Not contained | Not contained |
| Film evaluation | Thickness of film (μm) | 40 | 40 | 40 | 40 | 30 |
| | Total light transmittance (%) | 86.3 | 87.7 | 87.5 | 83.7 | 88.37 |
| | YI | 4.9 | 6.4 | 4.8 | 13.2 | 19.9 |
| | Refractive index nD | 1.67 | 1.67 | 1.71 | 1.70 | 1.67 |
| | Glass transition temperature (° C.) | 379 | 282 | 363 | 285 | 278 |

The invention claimed is:

1. A polyimide resin comprising a structural unit A derived from a tetracarboxylic dianhydride and a structural unit B derived from a diamine compound,
wherein the structural unit A comprises
a structural unit (A-1) derived from a compound represented by the following formula (a-1)

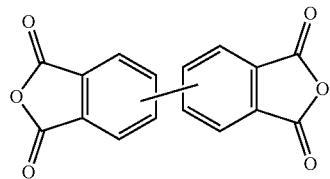
(a-1)

and a structural unit (A-2) derived from a compound represented by the following formula (a-2)

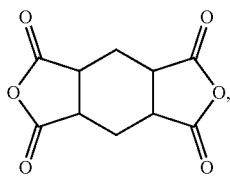
(a-2)

wherein
the proportion of the structural unit (A-2) in the structural unit A is 60 mol % or less; and
the structural unit B comprises 85 mol % or more of a structural unit (B-1) derived from a compound represented by the following formula (b-1):

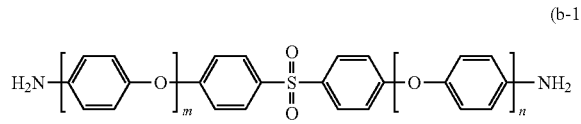
(b-1)

wherein m and n in the formula (b-1) each independently is an integer of 0 or 1, and
wherein the structural unit (B-1) comprises 50 mol % or more of a structural unit (B-1-1) derived from a compound represented by the following formula (b-1-1):

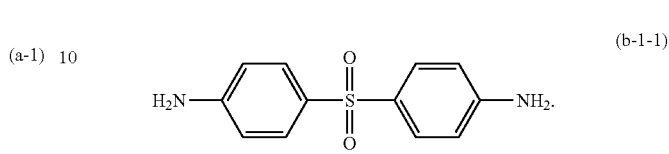
(b-1-1)

2. The polyimide resin according to claim 1, wherein the structural unit B further comprises a structural unit (B-2) derived from a compound represented by the following formula (b-2):

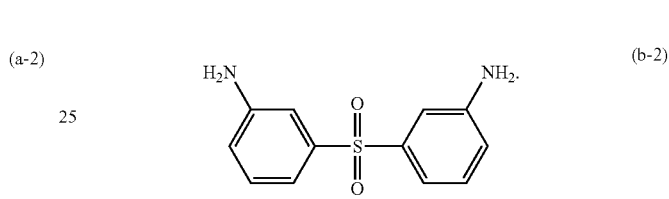
(b-2)

3. A polyimide resin composition comprising:
the polyimide resin according to claim 1; and
inorganic particles having a refractive index of 2.0 or more and an average particle diameter D50 of 20 nm or less.

4. The polyimide resin composition according to claim 3, wherein the inorganic particles are zirconium oxide particles and/or titanium oxide particles.

5. A polyimide film comprising a cured product of the polyimide resin according to claim 1.

6. A polyimide film comprising a cured product of the polyimide resin composition according to claim 3.

* * * * *